March 28, 1967      W. O. FROMM      3,311,276

PORTABLE CONSOLE FOR MOTOR VEHICLE

Filed June 30, 1965

INVENTOR.
WALTER O. FROMM
BY Edward M. Apple
ATTORNEY 3,311,276
PORTABLE CONSOLE FOR MOTOR VEHICLE
Walter Otto Fromm, 8276 Whitcomb,
Detroit, Mich. 48220
Filed June 30, 1965, Ser. No. 468,246
3 Claims. (Cl. 224—29)

This invention relates to automobile accessories, and has particular reference to a removable cover, or console, for the transmission housing area of a motor vehicle.

An object of the invention is to provide a portable console for a motor vehicle, which serves as a table or serving tray for the passengers.

Another object of the invention is to provide a portable console for a motor vehicle which may be used as a table or serving tray for the passengers, and is also provided with means for carrying in readily accessible places thereon personal belongings, such as sun glasses, maps, and the like, which are usually carried in the glove compartment of the vehicle.

Another object of the invention is to provide a portable console for a motor vehicle, which is provided with a removable boxlike storage compartment for the storing of tools, wiping cloths, windshield scraper, and the like, when the console is not being used as a table, or serving tray.

Another object of the invention is the provision of a device of the character indicated, which has certain demountable parts whereby the device can be used as a storage compartment, and at the same time serve as a platform, with a restricted area, for supporting small objects, when the device is in one condition, and may be used as a table or serving tray for food and drinks, with a comparatively larger area, when in another condition.

The foregoing and other objects and advantages of the invention will become more apparent as the description proceeds, reference being made from time to time, to the accompanying drawing, forming part of the within disclosure, in which drawing.

Figure 1:
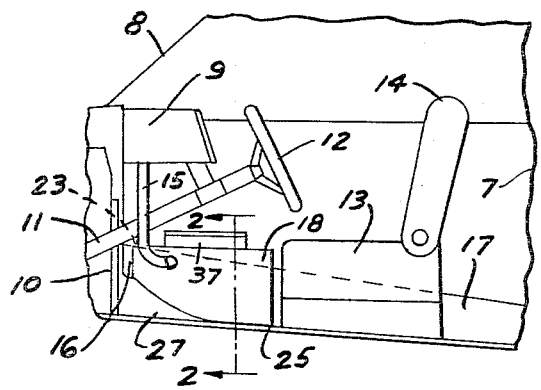
FIG. 1 is a fragmentary side elevational view of the front compartment of a motor vehicle, which is equipped with the device embodying the invention.

Referring now more particularly to the drawing, it will be understood that in the embodiment herein disclosed the reference character 7 indicates, in general, the body of a motor vehicle, having a windshield 8, dash 9, firewall 10, steering column 11, steering wheel 12, front seat 13, back rest 14, brake pedal 15, and transmission housing tunnel 16, which extends rearwardly as at 17, to accommodate the drive shaft of the vehicle.

The elements just described are conventional elements of a motor vehicle, and form no part of the invention, except as combined with the elements hereinafter described.

The invention resides in the provision of a portable console which is indicated, in general, by the reference character 18.

The console 18 may be made of wood, plastic, or other suitable material, and consists of a flat top member 19, side members 20 and 21, and end member 22, which are secured together by any suitable means.

Figure 2:
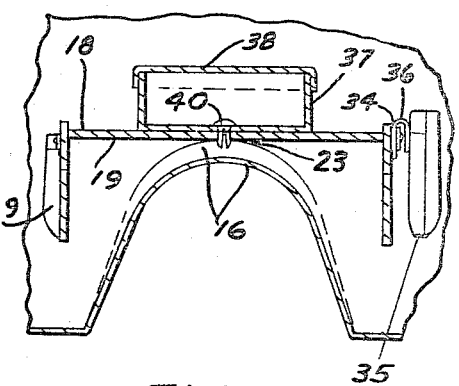
FIG. 2 is a vertical section taken substantially on the line 2—2 of FIG. 1.
Figure 3:
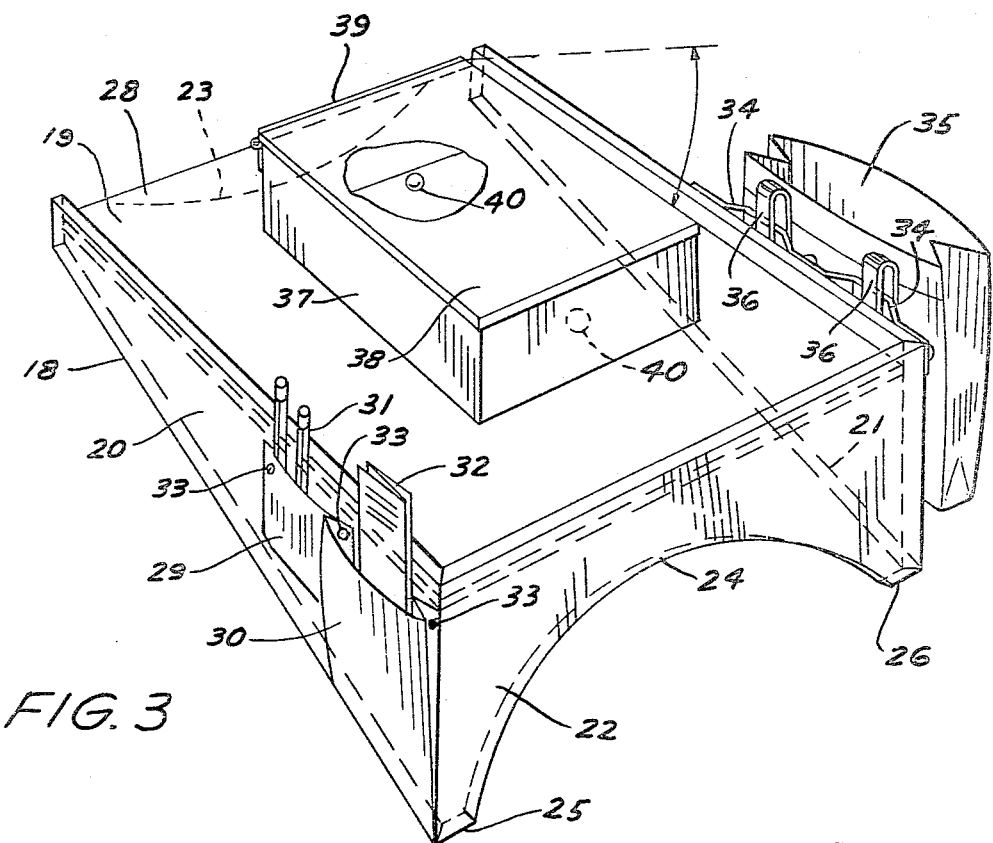
FIG. 3 is an enlarged perspective view of the device embodying the invention.

The top member 19 has a cut out portion 23, and the end member 22 has a cut out portion 24. The cut out portions 23 and 24 are arranged to be received over the tunnel 16. The portions 25 and 26 of the end member 22 rest on the floor 27 of the vehicle (FIG. 1). The edge of the cut out portion 23 contacts the top of the tunnel, as shown in FIG. 2, and serves as one of the support elements of the device. The cut out support portion 23, together with the members 25 and 26, which contact the floor of the vehicle, provide a three-point support for the console 18, which gives it a stable, level riding stance when the vehicle is in motion.

It will be noted that the side members 20 and 21, and the end member 22 extend above the flat surface of the top member 19, and serves as a guard rail, or fence, around the top member 19, so that things placed thereon may not fall off.

The members 19, 20, 21, and 22 are preferably covered, or trimmed, with a plastic material, or leather, 28 to match the interior decor of the vehicle.

In the plastic, or leather covering I provide pockets 29 and 30 for receiving pencils 31, maps 32, or the like. The pockets 29 and 30 are preferably secured to the plastic, or leather covering 28 by means of snap fasteners 33.

The opposite side of the console is provided with a bracket 34, to which is fastened a litter bag 35 by spring clips 36.

In addition to the elements just described, I provide the console 18 with a tool kit 37, which is in the form of a rectangular box, having a cover 38, which is hinged as at 39. The container 37 may be secured to the top 19 by snap fasteners 40, so that the receptacle 37 may easily be removed from the top member 19. The receptacle 37 is intended to carry tools or other objects which may be desired to be kept within easy reach. When the receptacle 37 is positioned on the console there is sufficient room remaining around its periphery for carrying small objects on the top of the console.

When it is desired to use the top 19 as a table, or serving tray, for the passengers, the receptacle 37 is removed so that the full area of the top 19 may be utilized as a table or tray.

It is believed that the operation of the device is obvious from the foregoing description.

Having described my invention, what I claim and desire to secure by Letters Patent is:

1. A portable console for a motor vehicle body having a seat, a fire wall, and a floor with an elevated area for accommodating a transmission housing comprising in combination a flat, horizontal tray member substantially co-extensive with the elevated area between the seat and the fire wall, and having at least one edge resting on top of said elevated area, an end member and two side members depending from said horizontal tray member, said end member and said side members having upward extensions forming a guard rail around a substantial portion of said horizontal tray member, said end member having a cut out portion for receiving said elevated area and said end member, and said side members having portions resting on said floor, the said horizontal tray member having received thereon a removable receptacle.

2. The structure defined in claim 1, including a flexible cover substantially co-extensive with said tray member and said end and side members, the said cover having pockets therein positioned along at least one of the side members.

3. The structure defined in claim 1, including a bracket secured to one of said side members, and a litter bag removably secured to said bracket.

References Cited by the Examiner

UNITED STATES PATENTS

| | | | |
|---|---|---|---|
| 1,113,590 | 10/1914 | Williamson | 224—5 |
| 1,508,724 | 9/1924 | Rose | 224—5 |
| 2,899,162 | 8/1959 | Young | 224—29 X |
| 2,988,206 | 6/1961 | Olson | 224—29 |
| 3,022,883 | 2/1962 | Barton | 224—29 |
| 3,109,537 | 11/1963 | Larkin | 224—29 |
| 3,163,287 | 12/1964 | Baronett | 206—19.5 |

HUGO O. SCHULZ, *Primary Examiner.*